(No Model.)
W. A. JACKMAN.
COUPLING FOR VEHICLE SHAFTS.
No. 591,764. Patented Oct. 12, 1897.
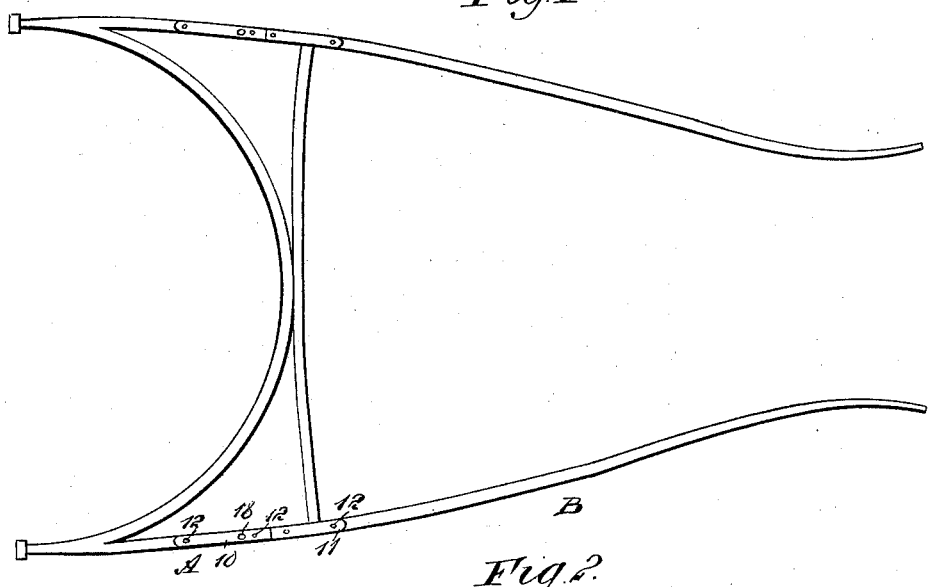
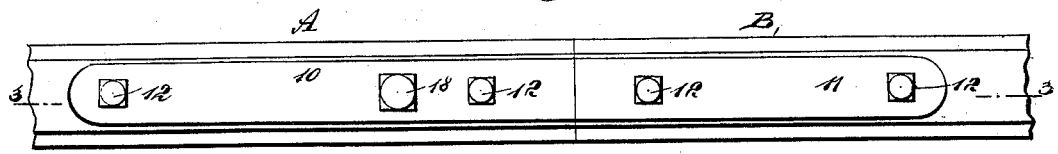
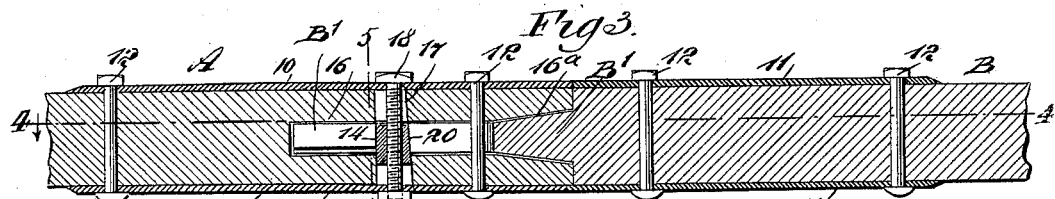
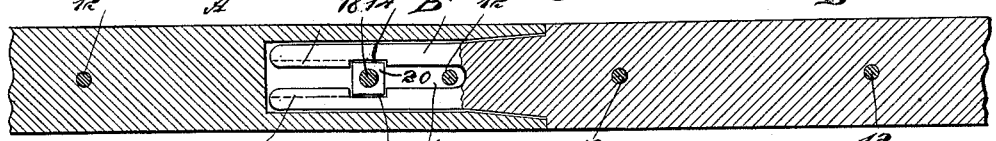
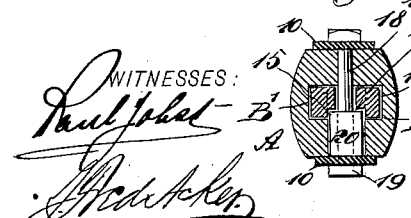
WITNESSES:
INVENTOR
W. A. Jackman.
BY
ATTORNEYS.
THE NORRIS PETERS CO., PHOTO-LITHO., WASHINGTON, D. C.

UNITED STATES PATENT OFFICE.

WILLIAM A. JACKMAN, OF CHEYENNE, WYOMING.

COUPLING FOR VEHICLE-SHAFTS.

SPECIFICATION forming part of Letters Patent No. 591,764, dated October 12, 1897.

Application filed February 17, 1897. Serial No. 623,775. (No model.)

*To all whom it may concern:*

Be it known that I, WILLIAM A. JACKMAN, of Cheyenne, in the county of Laramie and State of Wyoming, have invented a new and Improved Coupling for Vehicle-Shafts, of which the following is a full, clear, and exact description.

The object of the invention is to provide a vehicle-shaft coupling whereby the forward section of the shaft may be expeditiously, conveniently, and securely attached to a rear section and as readily and conveniently detached, in order that a pole may be substituted for shafts, for example, or whereby should a shaft become broken it may be readily replaced by another.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a plan view of the shafts of a vehicle having the improved coupling applied. Fig. 2 is a plan view of the front and rear sections of a shaft, drawn on an enlarged scale, showing only that portion of the two sections to which the coupling is applied. Fig. 3 is a vertical section taken substantially on the line 3 3 of Fig. 2. Fig. 4 is a horizontal section taken practically on the line 4 4 of Fig. 3. Fig. 5 is a transverse section on the line 5 5 of Fig. 3, and Fig. 6 is a horizontal section illustrating a modified form of the coupling.

Each shaft is made in two sections A and B, the section A being the pivoted or rear section, or that which is to be attached to the axle, and the section B the body or front section, which is to be adjacent to the animal harnessed. At the top and bottom of the forward ends of the rear sections A of the shaft irons 10 are secured, and corresponding irons 11 are secured upon the top and bottom portions of the rear ends of the front sections of the shaft. The irons 10 and 11 are held in place through the medium of bolts 12 or their equivalents, which pass through the shaft from top to bottom. At the rear end of the body or forward section B of the shaft a horizontal tongue B' is formed. This tongue is bifurcated by producing a slot 13 longitudinally in the rear end portion of the tongue. About midway of the slot 13 registering recesses 14 are formed in the side walls of said slot, and each member of the tongue at its rear end is provided with a longitudinal recess 15, extending from said rear end to the central recesses 14 at the inner under side of the longitudinal slot 13.

In the forward end of the rear section A of the shaft a horizontal socket 16 is formed, the mouth or forward end 16ª whereof is tapering, as is likewise the forward end portion of the tongue B', which is adapted to be received in the mouth-section of the socket, as shown in Fig. 3. The socket is preferably rectangular in cross-section, as is likewise the transverse shape of the tongue B'. An opening 17, polygonal in cross-section, is made in the rear section of the shaft, extending from the bottom iron to the top iron 10 and connecting with the socket 16. A screw 18 is passed loosely through the irons 10, the head of the screw being in engagement with the top iron, a nut 19 at the bottom of the screw being in engagement with the bottom iron 10, but the nut is so attached to the screw that it cannot be readily removed therefrom, serving as a second head. A lock-nut 20, which also acts as a key, is held to travel on the screw between its ends within the openings 17. The lock-nut 20 is polygonal in cross-section, corresponding in shape to the cross-sectional contour of the aforesaid opening 17.

The forward and rear sections of the shaft having been locked together, when it is desired to disconnect the sections of said shaft from each other the screw 18 is turned by a wrench or otherwise until the lock-nut 20 shall be carried to the lower portion of the opening 17, the upper edge of the nut being opposite the bottom recess 15 in the tongue B'. When the lock-nut is in this position, the forward section of the shaft may be readily removed from engagement with the rear section. When these two sections are brought together, the lock-nut 20 being in its lower position, the tongue B' of the forward section will slip readily into the socket of the rear section, and when the screw 18 has been turned in a direction to carry the lock-nut 20 upward into the recessed portion of the tongue, as shown in Figs. 3 and 4, the locknut will effectually prevent one section of the shaft becoming separated from the other. When the sections of the shaft have been connected in the manner above described, the joints will be practically imperceptible and the shaft will present the ordinary outward appearance.

In Fig. 6 I have illustrated a slight modification in the form of the coupling, in which the socket 21 in the rear section of a shaft is made rearwardly tapering, the tongue 22 of the forward section of the shaft being correspondingly shaped. An opening 23, polygonal in cross-section, is made in the tongue 22, corresponding openings 24 being made in the pivoted section A of the shaft at the top and bottom. The upper opening is preferably of less dimensions than the lower opening. A screw 25 is held to turn in the upper opening 24 of the pivoted section, a nut 26, which is adapted to travel in the lower opening 24 of the rear section and the openings 23 in the tongue of the forward section, being placed upon the lower portion of said screw 25. Under this construction the irons 10 and 11 (shown in Fig. 3) need not be used.

It is evident that when the forward sections B of vehicle-shafts have been removed from the rear sections a pole having arms carrying sockets corresponding to those of the aforesaid body-section may be substituted for the shafts, the coupling being the same in either case.

Having thus described my invention, I claim as new and desire to secure by Letters Patent—

1. In a vehicle-shaft coupling, the combination, with a rear section having a socket formed therein, of a forward section having a tongue arranged to enter the aforesaid socket, a lock-nut held to travel in the rear section and into the said tongue, and means, substantially as described, for moving the lock-nut, as and for the purpose specified.

2. In a vehicle-shaft, the combination, with a rear section provided with a longitudinal socket and transverse openings connecting with the socket, of a forward section provided with a tongue adapted to slide into the socket, having an opening arranged to register with the openings in the rear section, a nut held to travel in the openings in the rear section of the shaft and enter the openings in the tongue of the forward section of the shaft, and means, substantially as described, for moving said nut from the exterior of the shaft, as and for the purpose specified.

3. The combination, with a rear section of a shaft or pole and a forward section adapted for connection with the rear section, the rear section being provided with a horizontal socket, and an opening communicating with the socket, located partially above and partially below the same, of a tongue extending from the forward section of the shaft, adapted to fit into the socket, a screw operated from the exterior of the shaft and extending through the openings in the rear section and registering opening in said tongue, and a nut carried by said screw, adapted to travel in the opening in the tongue and the registering openings in the rear section of the shaft or pole, substantially as shown and described.

4. The combination, with the rear section of a shaft or pole having a socket formed therein, and a forward section arranged for engagement with the rear section, of a nut having end movement in the rear section and in the tongue, and means, substantially as described, for operating said nut from the exterior of the shaft or pole, as and for the purpose specified.

5. The combination, with a rear section of a shaft or pole and a forward section adapted to be coupled therewith, the rear section being provided with a socket and the forward section with a tongue to enter said socket, the rear section of the tongue being provided with registering openings, of a nut arranged to travel in the registering openings of the tongue and the rear sections of the shaft or pole, and a screw carrying said nut, held to turn loosely in the rear section and arranged to be turned from the exterior of the shaft or pole, as and for the purpose set forth.

WILLIAM A. JACKMAN.

Witnesses:
WILLIAM STUHR,
WM. R. SCHNITGER.